United States Patent [19]

Fredrickson

[11] Patent Number: 4,606,466
[45] Date of Patent: Aug. 19, 1986

[54] PEGBAR DISPLAY DEVICE HAVING A CARRIER FOR GRAPHIC IDENTIFICATION

[75] Inventor: Howard J. Fredrickson, Cannon Valley Township, Goodhue County, Minn.

[73] Assignee: Cannon Equipment Company, Cannon Falls, Minn.

[21] Appl. No.: 596,126

[22] Filed: Apr. 2, 1984

[51] Int. Cl.[4] ................................................ A47F 7/00
[52] U.S. Cl. .................................... 211/59.1; 211/162; 248/222.3; 248/231.9; 40/16; 40/490; 403/247
[58] Field of Search .................. 211/59.1, 57.1, 94, 211/162, 193; 248/220.3, 222.3, 231.9, 245; 40/16, 490; 403/247; 411/401, 435

[56] References Cited

U.S. PATENT DOCUMENTS

| | | | |
|---|---|---|---|
| 2,626,711 | 1/1953 | Saul, Jr. et al. | 211/13 |
| 2,802,576 | 8/1957 | Kelling | 211/59.1 |
| 3,183,293 | 6/1965 | Curry | 411/401 |
| 3,486,632 | 12/1969 | Balch | 248/221.2 |
| 3,495,717 | 2/1970 | Lavin et al. | 248/220.3 X |
| 3,567,036 | 3/1971 | Tonjum et al. | 248/220.3 |
| 3,986,613 | 10/1976 | Mayer | 211/57.1 |
| 4,007,841 | 2/1977 | Seipel | 211/59.1 |

FOREIGN PATENT DOCUMENTS

| | | | |
|---|---|---|---|
| 535712 | 4/1922 | France | 211/59.1 |
| 1300895 | 7/1962 | France | 411/401 |
| WO82/03321 | 10/1982 | PCT Int'l Appl. | 211/59.1 |

Primary Examiner—Ramon S. Britts
Assistant Examiner—Blair M. Johnson
Attorney, Agent, or Firm—Henry C. Kovar

[57] ABSTRACT

A pegbar display device for presenting packages such as cold cut or cheese packages, or automotive parts, for retailing has a peg support bar and a merchandise peg; the bar is a rectangular tube having a keyhole that is taller than it is wide and with a flat bottom, the bar back member has a corresponding backbore which is directly behind and slightly below the keyhole; the peg has a front body, a toe on the back of the body, a horizontal indexing flat on the bottom of the peg, and lateral abutments between the toe and the index flat; the peg is turned ninety degrees to go into the bar; when in the bar the peg is then turned back ninety degrees and the index flat rests upon the keyhole flat bottom and the abutments engage the inside of the tubular bar to retain the peg in the bar. An information carrier is mountable in front of the support bar, and on carrier support pegs, each carrier peg has a friction lock outer end with an inward facing shoulder and a wing nut, the carrier is a display bar having a rearward facing C-section that is clamped by the shoulder nut; the carrier and support pegs are normally locked in the bar, however, the carrier support pegs can be loosened from the carrier and rotated for release of the carrier from the support bar.

20 Claims, 8 Drawing Figures

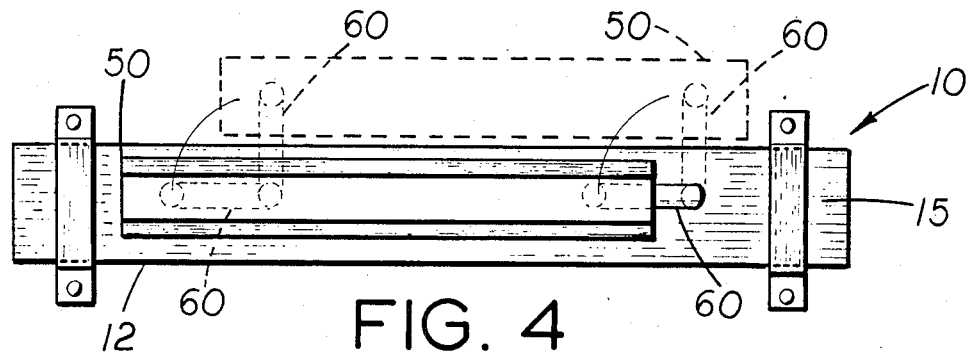
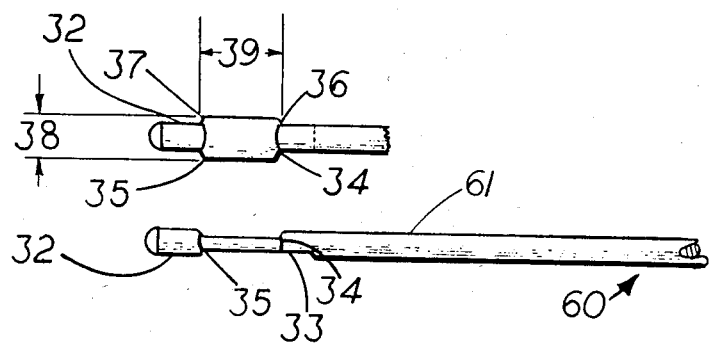
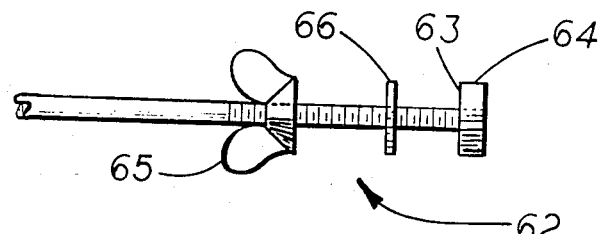
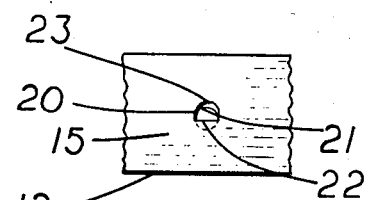
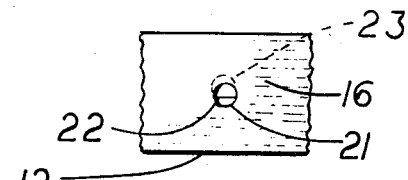

PEGBAR DISPLAY DEVICE HAVING A CARRIER FOR GRAPHIC IDENTIFICATION

BACKGROUND OF THE INVENTION

1. Field of the Invention

This invention pertains to a pegbar display device having an identification bar for presentation of graphics, the device is commonly used for display of packages of meat and cheese in supermarket coolers, and for presentation of blister packaged small goods such as tools, auto parts and pet supplies, and the identification bar presents advertising and pricing.

2. The Prior Art

Display devices of this type are commonly termed peg bars. Peg bars are most often used and seen in businesses that retail groceries, specifically supermarkets, grocery stores and convenience stores. Peg bars are being used to display pre-packaged cheese slices and sliced sandwich meat. Peg bars are also used for blister packed goods such as small auto parts, electronic goods, cabinet hardware, screws and nails, lawn hardware, fishing tackle, photographic goods and the like.

The typical pegbar has a transverse structural bar fastened to a wall of some type. The structural bar serves as a beam for pegs which are supported in any one or more of a series of holes and slots along the length of the bar. The bar is loaded under both beam and torsional stress.

One well known existing pegbar is used by Kraft Foods and is subject of Mayer U.S. Pat. No. 3,986,613. This display device has an angle iron which is disposed with its apex down or in the V configuration. The front flange of the V-shape has vertical slots cut in through the top edge. The back flange of the V-shaped bar has an obround hole behind each of the front flange slots. The pegbar is a length of round steel wire having an upturned nose and a pair of spaced apart vertical flags on the back of the flag. The "flag" referred to is a flattened length of wire that has been hit in the flat dies on each side and the wire is changed from round to flat. In the just described pegbar, the back flag goes into the back flange hole and the front flange goes into the slot. The peg is then indexed with the flags being upright and the peg nose being upright, and the peg is retained in the bar by a round section in between the flags. The round section cannot be pulled through the front slot nor pushed through the back hole.

This pegbar does have its disadvantages. Firstly, it's heavy and material intensive. For example, a standard fourty-eight inch long bar with eleven pegs weighs 10 lbs. 5 ozs. At this weight the bar is made of the standardly used $3/16 \times 1\frac{1}{2} \times 1\frac{1}{2}$ angle iron which is the standard bar material. The pegbar tends to droop from both torsional and beam loading. For example, a full load of meat or cheese on this bar will droop the noses of the centrally located pegs well in excess of two inches as measured vertically. The V-bar simply does not have enough strength either in bending or torsion to support a full load of goods on its pegs.

Close vertical spacing of pegbars one above the other is important to retailers. By getting the pegbars as close as possible, more horizontal rows of goods can be displayed in a given length of floor space, shelf space, or cooler space. Conversely, a shorter cooler may be used with more efficient pegbars. The sag of known pegbars, such as just described, means the pegbars have to be spaced package height plus clearance and allowance for sag of the middle pegs and a row may be lost.

An important criterion for pegbars is that the peg be removable, together with unsold packages left on the peg, and the peg be refillable or reloadable from the back so that inventory can be sold on a FIFO (first in-first out) basis without loss of product that was previously unsold. This is critical in the retailing of perishables. In order to be loadable from the back, the peg must have a minimal cross section so that the pierced hole in the packages is not ripped out. The large vertical flags on the just discussed peg do tend to vertically tear the package holes, and then the package must be discounted or discarded. Another of the detrimental aspects of the prior pegbar is that the nose of the peg must be lifted almost three inches to remove the peg for reloading and for reinstallation of the loaded peg. Consequently, the pegbars had to be mounted above one another a height equal to package height plus about three inches. For some reason the pegs in this type of bar tend to bend at the edge of the flags, probably from excessive stress concentration. The V-section is also a trap for dust, product and debris.

Another type of pegbar is used by Oscar Mayer and is subject of Bolch U.S. Pat. No. 3,486,632. This pegbar utilizes what is more or less the same bar as the Kraft bar, but the Oscar Mayer bar has a flat in what was the obround hole in the rear flange. The peg is round and has an upturned nose but does not have rear flags. This peg has a machined or headed horizontal notch in the top of the back of the peg. The notch faces upward and engages the top flat in the back hole to index the peg and to retain the peg in the bar. This peg is easy to remove and install; it only has to be turned about sixty degrees and it will then either come out or go in. The problem with this peg is that it does not stay in well and it falls out too often, especially when customers pull upward on packages they are removing from the peg. Again, this pegbar is relatively heavy and a standard forty-eight bar with eleven pegs weighs about ten and one half pounds. The peg is also difficult to engage and index properly because it is very easy to push in too far or not enough.

One of the problems with pegbar display and merchandising is provision for display of pricing, ad copy, bar code information and pricing specials. Past practice has been to utilize label holders on shelving above, below or to a side of the pegbar display.

The Schweigert Company devised a bar type label holder that is not patented, and that extended transversely across a pegbar display either above or in front of the pegs. The Schweigert label holder, commonly called an I.D. bar, was held in place by metal brackets secured by bolts to the pegmount. The I.D. bar was bolted to the brackets and the entire structure was semi-permanently assembled. The I.D. bar was fixed in place on the display.

Clamp Swing Pricing Company of Alameda, California devised a different type of I.D. bar that is shown in a PCT application IPN W082/03321 based on unissued U.S. Ser. No. 248,491 of Mar. 27, 1981, and that is clipped to a support peg that is interchangeable with a merchandising peg, insofar as both support and merchandise pegs will fit in any slot of Clamp Swing's support bars.

These devices both have some common problems. They both obstruct raising, removal and insertion of merchandise pegs. In order to accommodate the height obstructions, the merchandise pegs need additional and wasted vertical spacing. The additional vertical space enables the merchandise bars to be lifted and removed for refilling, and for refilled pegs to be reinstalled in the support bar. Typically, the problems of product information and pricing turn pegbar displays of packaged items into a disaster area. Manipulation of this information leads to spillage of product and refilling of product upsets the information displays.

The Schweigert device cannot be removed from the display without tools, but the Clamp Swing device pulls out and falls out if snagged by a package pulled upward off a lower merchandise peg. The Clamp Swing display device then falls on the consumer, or at the consumer's feet, or upon lower goods.

The retailer wants a pegbar system that will not accidentally come apart in use and which is easily loaded and reloaded and which is easy to rearrange into different configurations.

OBJECTS OF THE INVENTION

It is an object of the present invention to provide a new pegbar display system having an information carrier, carrier support pegs, and structure for selectively indexing the carrier support pegs to the carrier and for selectively releasing the carrier support pegs from the carrier, enabling the carrier and pegs to be removed or installed as an assembly from a peg support bar.

It is an object of the present invention to provide a new pegbar system having an improved information carrier and display which enables adjacent levels of merchandise pegbars to be placed closer to each other.

It is an object of the present invention to provide a new pegbar system having an information display giving improved access to merchandise pegs and goods upon these pegs.

It is an object of the present invention to provide a pegbar display system having an information carrier that cannot be accidentally removed during the course of normal retailing from the system.

It is an object of the present invention to provide a new information carrier for a pegbar, the new carrier being easily removable and insertable in the pegbar and allowing unobstructed refill of merchandise pegs.

It is an object of the present invention to provide a new support peg for an information carrier in a pegbar system, the new beg being selectively engageable and disengageable with the carrier, enabling convenient installation or removal of the carrier as well as convenient access to merchandise pegs for refilling of the pegbar with merchandise.

It is an object of the present invention to provide a pegbar display system having an improved information carrier enabling simplification and functional improvement of the entire system.

These and other objects will become manifest to those versed in the art upon review of the teachings herein.

SUMMARY OF THE INVENTION

According to the principles of the present invention, a pegbar display system has a peg support bar, a merchandise peg acceptable in the bar, an information carrier for presenting graphics associated with merchandise on the peg, a carrier support peg having a toe acceptable in the bar and an elongate standoff and an outer end for engaging and supporting the carrier, and structure in the carrier and outer end for selectively indexing or releasing the carrier support peg to or from the carrier. When released, the support peg may be turned enabling removal of the carrier and support peg from the bar.

An information carrier support peg for a pegbar system has a toe acceptable in and securable in a support bar, an elongate body extending forward of the toe, and an outer end on the body, the outer end has a rearward facing shoulder and structure inward of the shoulder for selectively clamping a carrier against the shoulder.

A pegbar display system having a peg support bar, a merchandise peg acceptable in the bar, and an information carrier support peg acceptable in the bar, has an improved information carrier having frontal facing structure for presentation of graphics and a rearward facing open C-shaped section mountable upon the carrier support peg.

BRIEF DESCRIPTION OF THE DRAWINGS

FIG. 4 is a front elevational view of the structure of FIG. 1 with the information carrier lowered;

FIG. 5 is a side elevational view of an alternative carrier support peg for the structure of FIG. 1;

FIG. 6 is a top plan detail of the toe of a peg;

FIG. 7 is a front elevational view of a portion of the peg support bar; and

FIG. 8 is a rear elevational view of a portion of the peg support bar.

AS SHOWN ON THE DRAWINGS

Figure 1:
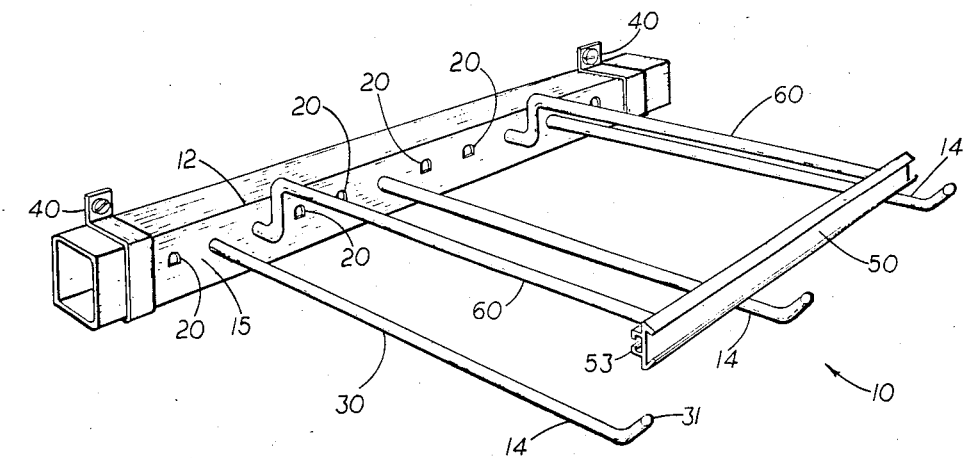
FIG. 1 is a perspective view of the preferred embodiment of a pegbar display system according to the present invention looking at the front, top and left end from a customer's viewpoint.
Figure 2:
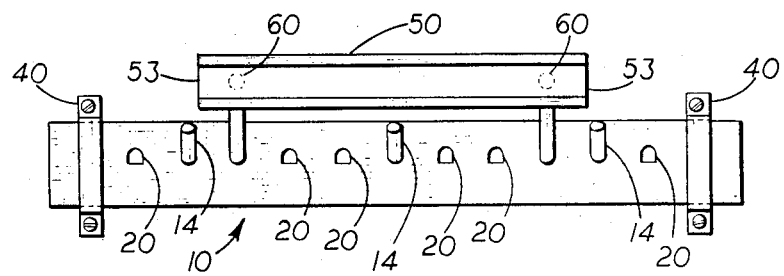
FIG. 2 is an elevational front view of the structure of FIG. 1.
Figure 3:
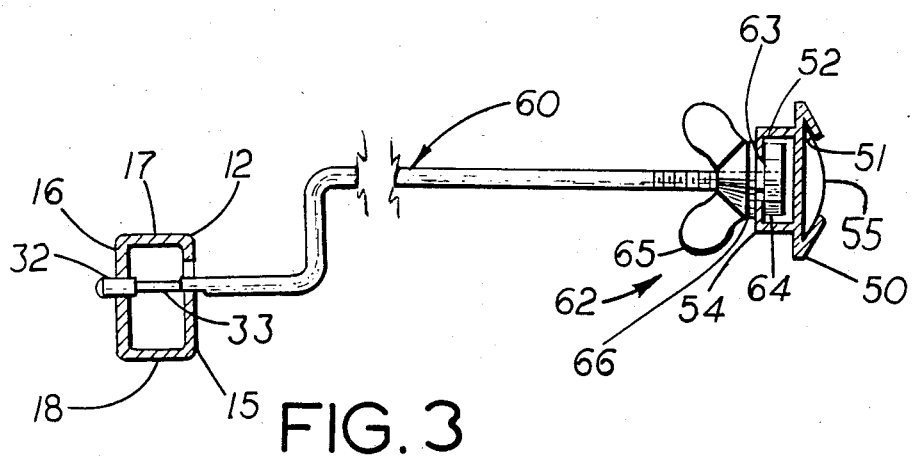
FIG. 3 is a side elevational view from the left end of the structure of FIG. 1.

The principles of the present invention are particularly useful when embodied in the pegbar display system shown in FIGS. 1 and 2 and generally indicated by the numeral 10. The pegbar system 10 includes an improved peg support bar 12, one or more merchandise pegs 14 for presentation and display of goods, an information carrier 50 and carrier support pegs 60.

The bar 12 is an elongate length of closed tubing, preferably of thin wall rectangular tubing. The bar 12 has a front member 15, and a rear member 16 which is spaced from the front member 15 by a top 17 and a bottom 18. The bar 12 is used in a position wherein the front and back members 15, 16 are both taller than the top and bottom 17, 18 are deep. A preferred tube for the bar 12 is low carbon welded rectangular tubing of one inch by one and one-half inches on the outside with one-sixteenth inch wall thickness. The bar 12 has its height substantially greater than its depth so that the bar has optimal beam and torsion strength. The top 17 and bottom 18 are both imperforate for strength, appearance and cleaning, and the front and rear members 15, 16 have the structure for supporting the pegs 14, 60 and the carrier 50.

The structure for supporting the pegs 14, 60 comprises one or more keyholes 20 in the front member 15, and behind each keyhole 20 is a backbore 21 in the rear member 16. All of the keyholes 20 are alike and all of the backbores 21 are alike. A respective pair of keyholes 20 and backbore 21 holds one peg 14, 60. The respective pairs of keyholes 20 and backbores 21 are evenly spaced along the transverse length of the bar 12 and a peg 14, 60 will fit in any pair. The transverse spacings between adjacent pegs 14, 60 can be varied to optimally space the pegs 14, 60 for the packages to be presented.

Each keyhole 20 is vertically located slightly above a center or mid-level of the bar 12 as measured between the top and bottom 17, 18. Each keyhole 20 has a flat bottom 22 which extends the full width of the keyhole 20. At the top of the keyhole 20 is a rounded top 23 having a diameter equal to the width of the keyhole flat bottom 22. The height of the keyhole 20 is greater than the width of the keyhole 20. A specific preferred size of keyhole 20 is 0.297 inches wide by 0.350 high.

The backbore 21 is directly behind and slightly lower than a respective keyhole 20. Each backbore 21 is centered on the vertical centerline or mid-level of the back member 16 and each keyhole 20 is slightly higher than a respective backbore 21. A specific preferred size of backbore is 0.318 inches diameter. The keyhole flat bottom 22 is a level above the level of a bottom 24 of the backbore 21.

The merchandise pegs 14 are all substantially identical and interchangeable. The standard length for the peg 14 is twelve inches; shorter and longer lengths are also used. Each peg 14 has a body 30 on the front part of the peg 14 for support of goods for presentation during retailing. On the very forward end of the body 30 of the merchandise peg 14 is an upwardly turned nose 31 that lies in a vertical plane, as seen from the front as in FIG. 2. Each peg 14, 60 has a toe 32 forming the back end of the peg 14, 60. The toe 32 and body 30 are of the same diameter; a preferred diameter is 0.283 inch. Between the toe 32 and the body 30 is a horizontal indexing flat 33. The indexing flat 33 is cold headed into the peg 14, 60 while a round section above the flat 33 is restrained in its original round form and diameter. That part of the peg 14, 60 which is immediately above the flat 33 has a round cross section, save for the flat 33. The index flat 33 had a width which is equal to a majority of the width of the peg body 30. For example, if the peg body 30 is of the preferred 0.283 inch diameter, the index flat 33 has a width greater than 0.142 inch. Behind the index flat 33 and between the body 30 and the toe 32, is a first lateral abutment 34 which extends rearward to a first rear abutment 35. The first abutments 34, 35 are co-planar with each other and the rear abutment 35 is a rearward facing extension of the first lateral abutment 34. On the opposite side of the peg 14, 60 is a second lateral abutment 36 and a second rear abutment 37. The second rear abutment 37 is a rearward facing extension of the second lateral abutment 36. Both rear abutments 35, 37 are just forward of the toe 32. The horizontal index flat 33 lies in a horizontal plane which is perpendicular to the vertical plane of the nose 31. The abutments 34, 35, 36, 37 all lie in a common thick horizontal plane just above plane of the index flat 33. The abutments 34, 35, 36, 37 have a width 38 which is less than one and one-half times the diameter of either of the body 30 or the toe 32, and which is less than the height of the keyhole 20. The abutment width 38 is greater than the width of the keyhole 20 and the diameter of the backbore 21. A preferred abutment width 38 is 0.333 inches. Both the first and second lateral abutments 34, 36 face forward and are at the same place along the length of the peg 14, 60, just rearward of the index flat 33. The rear abutments 35, 37 face rearward at the same place on the length of the peg 14 and just forward of the toe 32. The length 39 between the front abutments 34, 36 and the rear abutments 35, 37 is less than the spacing between the keyhole 20 and the backbore 21.

The bar 12 is clamped by a pair of support clamps 40 to mounting brackets (not shown) which are intended to hook into vertical shelf holders (not shown) and the clamps 40 enable loosening and sliding of the brackets on the bar 12 to match the spacing between the shelf holders.

The information carrier 50 is preferably an elongate transverse bar having a frontal track 51 for holding and presenting snap-in graphics 55, and an open C-shaped rear track 52 which has both ends 53 open. The rear track has a pair of flanges 54. The carrier 50 is preferably materially integral so that the frontal track 51 and rear track 52 are in and of the same piece of material; for example, in a plastic extrusion.

There preferably is a pair of identical carrier support pegs 60 mounted one on each end of the carrier 50 for two-ended support of the carrier 50. Each carrier peg 60 has an elongate standoff 61 which is equivalent to the previously described body 30 of the merchandise peg 14. The standoff 61 is of an appropriate length and may be straight as shown in FIG. 5 for support of the carrier 50 in front of the merchandise pegs 14, or may be vertically offset as shown in FIGS. 1-4 for support of the carrier 50 above the merchandise pegs 14 and for elevating the standoffs 61 above the peg bodies 30. Each carrier peg 60 has an outer end 62 having a rearward facing shoulder 63 which has a diameter greater than twice the diameter of the standoff 61 and which is concentric to the standoff 61 and which extends completely around the standoff 61. The shoulder 63 is preferably the back side of a machined washer 64 which is threaded on to the outer end 62, which is also threaded, and then staked to the outer end 62 so it is non-rotatable and non-removable. Rearward of the permanently fastened shoulder 63 is a forward facing wing nut 65 and a floating washer 66. The nut 65 and floating washer 66 are both permanently retained upon the carrier peg 60 by the fixed washer 64.

In use and operation of the pegbar 10, the bar 12 is mounted to some type of upright backboard or frame (not shown). The pegs 14, 60 are inserted in the bar 12 by turning the peg 14 ninety degrees so the abutments 34, 35, 36, 37 will go through the keyhole. When the peg 14, 60 is inserted, the toe 32 will go into the backbore 21 and the rear abutments 35, 37 will abut against the back member 16 and stop insertion of the peg 14. The peg 14, 60 is then turned ninety degrees, with peg 14 the nose 31 points upward. The index flat 33 will positively engage the keyhole flat bottom 22 and radially index the peg 14, 60 to the bar 12. The front lateral abutments 34, 36 engage the inside of the bar front member 15 on each back side of the keyhole 20 and prevent the peg 14, 60 from being pulled out of the bar 12. The peg 14, 60 is held substantially horizontal when the peg 14, 60 is indexed in the keyhole 20 and the backbore 21. The more weight that is hung on the peg body 30 the more positive is the engagement of the index flat 33 upon the keyhole flat bottom 22. The merchandise peg 14 can be loaded from the front while in the bar 12, if FIFO is not important. If FIFO is important, for perishable goods, the merchandise peg 14 can easily be loaded from the back. Assuming there are unsold goods such as cold cuts or cheese on a merchandise peg 14, the merchandise peg 14 is removed from the bar 12 by turning the peg 14 ninety degrees and lifting the nose 31 upward about ⅜ inch. The peg 14 with the goods on it then comes out and off of the bar 12. New packages are then pushed over the peg abutments 34–37 and onto the peg body 30. The abutments 34–37 have a width 38 less than the aperture of the packages so there is no tearing of packages. The loaded merchandise peg 14 is then reinstalled as previously described. The index of the peg 14, 60 to the bar 12 is absolutely solid with no rocking of the peg 14, 60. The more the peg 14, 60 is loaded, the more pressure on the index. The physical contact of the index flat 33 on the keyhole flat bottom 22 actually supports the load on the peg 14, 60. If and when the peg 14, 60 is pulled up by a customer removing a package, the peg 14, 60 will not accidentally pull out of the bar 12. The pegbars 10 can be closer together one atop of another, because these pegbars 10 do not droop and because of the minimal height needed to lift up and remove or replace the merchandise pegs 14 with or without goods on the peg body 30. The pegs 14, 60 do not accidentally pull out of the bar 12. The pegs 14, 60 do not rattle from side to side, because of the positive index. The bar 12 does not have a visible debris trap and does not have sharp edges. The bar 12 and the pegs 14, 60 can all be easily cleaned without danger of damaging fingers.

The carrier pegs 60 are placed into the bar 12 just as are the merchandise pegs 14. These pegs 14, 60 are interchangeable in all of the keyholes 20 and the optimal spacing is left to the discretion of a retailer or display preparer. After the carrier pegs 60 are installed in the bar 12, the carrier 50 may be slipped transversely from either end upon the carrier pegs 60. The nuts 65 are backed off and the C-shaped track 52 is pushed on over the washers 64. When the carrier 50 is properly positioned, the nuts 65 are tightened and the flanges 54 are frictionally clamped in between the shoulders 63 and the washers 66. When so clamped, the carrier 50 is laterally fixed and the carrier pegs 60 are frictionally radially indexed and fixed to the carrier 50. More specifically, the carrier pegs 60 cannot rotate with respect to the carrier 50 nor with respect to the bar 12. This rotational index is important because it effectively positively locks the carrier pegs 60 in a non-removable configuration in the bar 12.

FIG. 4 illustrates the pegbar system 10 with the carrier 50 moved to the left and down, and in a position wherein the carrier 50 and its carrier pegs 60 can be removed as an assembly from the bar 12. The carrier pegs 60, just as the merchandise pegs 14, must be rotated ninety degrees to either side for insertion or removal, and when the carrier pegs 60 are upright, they cannot be inserted or removed from the bar 12. As previously described, the carrier pegs 60 are normally fixed in a non-rotatable manner by being clamped to the carrier 50. The carrier pegs 60 are released and made rotatable by backing off the nuts 65 and loosening the shoulders 63 which enables the carrier pegs to be rotated with respect to the carrier 50 and with respect to the bar 12. When the carrier pegs 60 are so loosened, the carrier 50 can be pushed either to the left as is shown or to the right (not shown) and the offset carrier pegs 60 shown follow the carrier 50 until the carrier pegs have turned ninety degrees. The carrier 50 and carrier pegs 60 can then be pulled out of the bar 12 as an assembly and then can likewise be reinstalled into the bar 12 as an assembly. If the straight carrier peg 60, of FIG. 5, is utilized, each carrier peg 60 must be manually grasped and turned ninety degrees. Then the carrier 50 and straight carrier pegs 60 are removable and reassemblable as an assembly from and to the bar 12. Alternatively, the carrier pegs 60 may be preinserted in the carrier rear track 52 and left unclamped. The so assembled carrier 50 and carrier pegs 60 may then be manipulated into position so that the carrier pegs 60 are accepted by the bar 12.

This system, and the new carrier peg 60 and the improved information carrier 50 provide a substantial improvement over the known prior devices. The two most important known and realized advantages are that the carrier 50 and support pegs 60 cannot be removed from the bar 12 when clamped as previously described, and that the device does not require additional and excessive vertical spacing between adjacent bars 12 one above the other. The carrier 50 and carrier pegs 60 come out and go back on as a unit. It is easy to change information carriers 50 to longer, shorter, different color and the like. No tools are required. There are no loose parts as each nut 65 and washer 66 is permanently retained by the fastened washer 64. The carrier peg 60 including the nut 65, free washer 66 and fixed washer 64 are all easily plated and are corrosion resistant and easily cleaned. There is nothing to catch the fingers of a person working with the pegbar system 10. The pegbar system 10 is extremely versatile and enables a retailer to custom arrange a display as the retailer sees fit. This pegbar system 10 usually enables an extra row of bar 12 to be utilized in a given floor space, enabling a retailer to stock and display more product per unit of floor area. This pegbar system puts the graphic information right in front where the consumer can easily read it when making product selection. It is thought to be impossible to get a finger caught and squashed in this new pegbar system 10. When there new pegbars 10 are used by the retailers and public, many more advantages will probably be found.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A pegbar display system comprising:
   a. a peg support having peg support means for accepting and supporting pegs;
   b. a merchandise peg acceptable in said support means, said peg having means for displaying goods;
   c. an information carrier having means for presenting graphic information associated with goods on said merchandise peg;
   d. at least one carrier support peg having
      1. a toe acceptable in and radially indexable in said support means,
      2. an elongate standoff extending forward of and from said toe, and
      3. means on an outer end for engaging and supporting the carrier; and
   e. means in said carrier and on said outer end for selectively radially indexing said carrier support peg to said carrier, and for selectively releasing such radial index while the carrier support peg and the carrier are engaged, enabling turning of the carrier support peg with respect to the carrier and the support bar for removal of the carrier and carrier support peg as an assembly from the support bar.

2. A pegbar display system according to claim 1, in which said carrier comprises an elongate transverse bar, there being a pair of such carrier support pegs, with there being said selective radial indexing means for each of said carrier support pegs.

3. A pegbar display system according to claim 2, in which said carrier bar has a track slidably engagable upon said carrier support pegs, when said carrier support pegs are in said carrier bar.

4. A pegbar display system according to claim 3, in which said track is continuous along the length of said carrier bar.

5. A pegbar display system according to claim 3, in which said track has a pair of open ends.

6. A pegbar display system according to claim 2, in which said track and said carrier presenting means are materially integral.

7. A pegbar display system according to claim 1, in which said carrier engaging means comprises a washer fixed on the outer end of the carrier support peg.

8. A pegbar display system according to claim 7, in which said washer is concentric to the elongate stand-off.

9. A pegbar display system according to claim 7, in which said washer has a diameter greater than twice a diameter of the elongate stand-off.

10. A pegbar display system according to claim 7, in which the washer is threadedly attached to a to the outer end.

11. A pegbar display system according to claim 1, in which said carrier engaging means and said indexing means jointly comprise
 a. a fixed shoulder carried on the outer end of said carrier support peg;
 b. a C-shaped track on a backside of said carrier, said shoulder being within the track; and
 c. a fastener on the elongate standoff and rearward of the track, said track being selectively compressable between the shoulder and the fastener for frictionally indexing the carrier support peg to the carrier.

12. A pegbar display system according to claim 11, in which the shoulder is the backside of a round washer mounted on the peg.

13. A pegbar display system according to claim 11, in which the track overlaps both a top and bottom of said shoulder.

14. A pegbar display system according to claim 11, in which the fastener is a wing nut threadedly attached to a outer end.

15. A pegbar display system according to claim 14, including a floating washer between the wing nut and the shoulder.

16. In a pegbar display system having a peg support bar having means for accepting and supporting a peg;
 a peg acceptable in said support means, said peg having means for displaying goods; and
 an information carrier support peg acceptable in said support means, said carrier support peg having means for supporting an information carrier;
the improvement comprising an information carrier having
 (1) frontal facing means for presenting graphic information adjacent goods hanging on the first said peg, and
 (2) a rearward facing open C-shaped section slidably mountable upon said carrier support means, said C-shaped section being rotatably mounted to said carrier support means.

17. The improvement of claim 16, including means for radially fixing the carrier support means with respect to the carrier, said fixing means being engagable with rear flanges of said C-shaped section.

18. A peg bar merchandising and display system comprising:
 (a) a peg support bar having peg support means for supporting a plurality of laterally spaced apart pegs;
 (b) one or more merchandise pegs acceptable in and supportable by said support means, each said merchandise peg having means for supporting and displaying goods;
 (c) an elongate information carrier having means for presenting graphic information associated with goods on said merchandise pegs;
 (d) a pair of spaced apart carrier support pegs, each carrier peg having
  1. means requiring rotation for acceptance by said peg support means and which upon being accepted by the peg support means are freely rotatable in the peg support means into an axial locking position for positive securement of the carrier peg to the bar, said securement means being further rotatable back to an acceptance position in which said carrier pegs become removable from said peg support means,
  2. an elongate stand-off forward of said securement means, and
  3. means on an outer end for engaging and supporting the carrier, these carrier supporting means being rotatable in and with respect to the carrier; and
 (e) said carrier and said outer ends having means for selectively radially indexing the carrier pegs non-rotatably in said locking position so that carrier and carrier pegs cannot be removed from said bar, said indexing means being selectively releasable enabling rotation of said carrier pegs into the acceptance position so that the carrier and carrier pegs can be removed and then reinstalled in the bar as a unit.

19. A pegbar system according to claim 18, in which said indexing means includes a movable fastener carried on each carrier peg.

20. An information carrier support peg for a pegbar system, comprising:
 (a) an elongate toe having means for a single radial index in and to a peg bar support, and means for axial securement of the peg in a pegbar support when in the indexed position, said index means being rotatable while in said support and having a front downward facing horizontal index flat engageable against the support, said flat being bounded on its top side by a semi-circular diameter of the peg;
 (b) an elongate body extending from and forward of said toe;
 (c) a threaded outer end extending outward from said body, said outer end having
  (1) a round washer concentrically fixedly mounted upon and having a rear shoulder perpendicular to the threaded outer end, and
  (2) a captivated nut on said threaded outer end and in between the shoulder and the body, for selectively clamping a carrier against the shoulder for selectively radially indexing and fixing the support peg to the carrier and for radially fixing the toe in the support; and (d) a vertical offset in between the toe and the threaded outer end, said offset extending opposite from and upward with respect to said downward facing horizontal index flat, with said shoulder being offset upward from and being generally perpendicular to an axis of the toe with said threaded end being offset upwardly from said toe axis, so that when the nut is loosened the entire peg is rotatable and will rotate in and with respect to the pegbar support about the axis of the toe, and in which the threaded end and shoulder will travel through an orbital path while all the time having thereon an information carrier secured to the washer, for release and removal of the peg and carrier as a unit from the support without the carrier needing to be lifted above its normal display height.

* * * * *